US009636583B2

United States Patent
Atobe

(10) Patent No.: US 9,636,583 B2
(45) Date of Patent: *May 2, 2017

(54) STORAGE MEDIUM STORING GAME PROGRAM, GAME PROCESSING METHOD, AND INFORMATION PROCESSING APPARATUS

(71) Applicant: GREE, Inc., Tokyo (JP)

(72) Inventor: Hirohiko Atobe, Tokyo (JP)

(73) Assignee: GREE, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,964

(22) Filed: Sep. 1, 2016

(65) Prior Publication Data

US 2016/0367897 A1 Dec. 22, 2016

Related U.S. Application Data

(63) Continuation of application No. 14/291,358, filed on May 30, 2014, now Pat. No. 9,457,273.

(30) Foreign Application Priority Data

| May 31, 2013 | (JP) | 2013-116039 |
| Dec. 26, 2013 | (JP) | 2013-268385 |
| Mar. 5, 2014 | (JP) | 2014-042491 |

(51) Int. Cl.
*A63F 13/08* (2006.01)
*A63F 13/52* (2014.01)
(Continued)

(52) U.S. Cl.
CPC .............. *A63F 13/52* (2014.09); *A63F 13/21* (2014.09); *A63F 13/25* (2014.09); *A63F 13/35* (2014.09);
(Continued)

(58) Field of Classification Search
USPC ................................................ 463/30, 31, 34
See application file for complete search history.

(56) References Cited

U.S. PATENT DOCUMENTS

2006/0281545 A1 12/2006 Nakano et al.
2007/0032282 A1* 2/2007 Hamamoto ............. A63F 13/10
463/9

(Continued)

FOREIGN PATENT DOCUMENTS

| JP | 2006-341024 A | 12/2006 |
| JP | 2007-252696 A | 10/2007 |
| JP | 2013-054519 A | 3/2013 |

OTHER PUBLICATIONS

Japanese Office Action dated Nov. 29, 2016, of corresponding Japanese Application No. 2016-190205, along with an English translation.

*Primary Examiner* — Pierre E Elisca
(74) *Attorney, Agent, or Firm* — DLA Piper LLP (US)

(57) ABSTRACT

A game in which a first user and a second user do battle includes storing a first panel database that includes a plurality of panels that the first user possesses, and a second panel database that includes a plurality of panels that the second user possesses; selecting one or more panels to be disposed in one or more divisions of a game display screen including a display region formed by the divisions, from the first panel database and the second panel database; disposing the panels selected by the panel section function in the divisions; and displaying the game display screen on a screen display unit, wherein the data storage function further stores points set for the first user, which are decreased by disposing a panel, and the panel selection function selects a panel from the first panel database according to the points set for the first user.

15 Claims, 12 Drawing Sheets

(51) Int. Cl.
 *A63F 13/822* (2014.01)
 *A63F 13/21* (2014.01)
 *A63F 13/25* (2014.01)
 *A63F 13/35* (2014.01)

(52) U.S. Cl.
 CPC ...... *A63F 13/822* (2014.09); *A63F 2300/308* (2013.01); *A63F 2300/65* (2013.01)

(56) References Cited

U.S. PATENT DOCUMENTS

| | | | | |
|---|---|---|---|---|
| 2013/0288787 | A1* | 10/2013 | Yoshie | A63F 13/847 463/30 |
| 2014/0221094 | A1* | 8/2014 | Fujioka | A63F 13/2145 463/31 |
| 2014/0248947 | A1* | 9/2014 | Yoshie | A63F 13/847 463/30 |
| 2014/0295937 | A1* | 10/2014 | Takahashi | G07F 17/34 463/20 |
| 2015/0057085 | A1* | 2/2015 | Tagawa | A63F 13/33 463/42 |

* cited by examiner

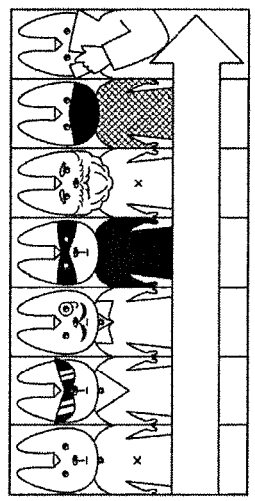
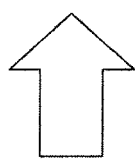
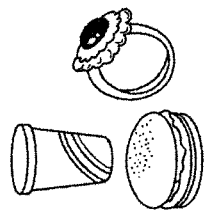
FIG. 10

STORAGE MEDIUM STORING GAME PROGRAM, GAME PROCESSING METHOD, AND INFORMATION PROCESSING APPARATUS

CROSS REFERENCE TO RELATED APPLICATION

This application is a continuation application of U.S. Ser. No. 14/291,358 that claims the benefit of JP 2013-116039, filed on May 31, 2013, JP 2013-268385, filed on Dec. 26, 2013, and JP 2014-42491, filed on Mar. 5, 2014. The entire content of JP 2013-116039, JP 2013-268385 and JP 2004-42491 is hereby incorporated by reference.

TECHNICAL FIELD

This disclosure relates to a storage medium storing a game program, a game processing method, and an information processing apparatus and, in particular, to a storage medium storing a game program and a game processing method of a game in which a plurality of characters battle against each other, and an information processing apparatus that controls the game.

BACKGROUND

In recent years, with the spread of electronic apparatuses such as smart phones and tablets, games played on these electronic apparatuses have been actively developed.

As an example of such a game, there is a card game in which the user plays against other users or against the computer using cards collected in the game.

Japanese Unexamined Patent Application Publication No. 2007-252696 discloses a technique regarding the card game described above. According to that technique, the user configures a deck with cards used in a play which is selected from a plurality of cards that the user owns, and plays a rock-paper-scissors game or the like with an opponent using the deck.

Such a card game system is familiar to many users today. However, since the use of a two-dimensional card in the battle scene is sometimes boring, there have been calls for improvement.

SUMMARY

It could therefore be helpful to provide a storage medium storing a game program and a game processing method of a game that gives a user a high visual effect, and an information processing apparatus that controls the game.

My storage medium stores a game program for a game in which first and second characters do battle. The game program causes a computer to realize: a data storage function of storing a first panel database that includes a plurality of panels that the first character possesses, and a second panel database that includes a plurality of panels that the second character possesses; a panel selection function of selecting panels to be disposed in frames of a game display screen including a display region formed by one or more frames, from the first and second panel databases; a panel layout function of placing the panels selected by the panel selection function in the frames; a screen display control function of displaying the game display screen on a screen display unit; and a frame execution function of executing the frames in which the panels are disposed by the panel layout function in predetermined order.

The predetermined order may be determined based on arrangement, shapes, and/or sizes of the panels.

My storage medium stores a game program that is for a game in which first and second characters do battle. The game program causes a computer to realize: a data storage function of storing a first panel database that includes a plurality of panels that the first character possesses, and a second panel database that includes a plurality of panels that the second character possesses; a panel selection function of selecting panels to be disposed in frames of a game display screen including a display region formed by one or more frames, from the first and second panel databases; a panel layout function of placing the panels selected by the panel selection function in the frames; a screen display control function of displaying the game display screen on a screen display unit; and a frame execution function of executing the frames in which the panels are disposed by the panel layout function, based on panel information indicating characteristics of the panels disposed in the frames.

The first character may be a user, the second character may be an enemy of the user, and the user and the enemy may play as a friend and a foe.

The first character may be a user, the second character may be a friend of the user, and the user and the friend may play as friends.

The plurality of panels may be given according to progress of the game.

The storage medium storing a game program described above may cause a computer to further realize an emphasized display function of emphasizing and displaying the panels disposed in the frames executed by the frame execution function.

The panel information may include information regarding the size of each panel.

The panel information may include information regarding the capability of each panel, and the strength of the capability may correspond to the size of each panel.

The display region may be divided by a plurality of turns.

Each of the panels may display a still image.

Each of the frames may further have a text display portion that displays texts, and the text display portion may be displayed to overlap the panel disposed in the frame.

Each of the frames may have a frame portion, and a frame portion of a frame, in which a panel selected from the first panel database is disposed, and a frame portion of a frame, in which a panel selected from the second panel database is disposed, may be constructed in different colors.

My game processing method is for a game in which first and second characters do battle. The game processing method causes a computer to execute: a data storage step of storing a first panel database that includes a plurality of panels that the first character possesses, and a second panel database that includes a plurality of panels that the second character possesses; a panel selection step of selecting panels to be disposed in frames of a game display screen including a display region formed by one or more frames, from the first and second panel databases; a panel layout step of placing the panels selected in the panel selection step in the frames; a screen display control step of displaying the game display screen on a screen display unit; and a frame execution step of executing the frames, in which the panels are disposed in the panel layout step, in predetermined order.

My game processing method is for a game in which first and second characters do battle. The game processing method causes a computer to execute: a data storage step of storing a first panel database that includes a plurality of panels that the first character possesses, and a second panel database that includes a plurality of panels that the second character possesses; a panel selection step of selecting panels to be disposed in frames of a game display screen including a display region formed by one or more frames, from the first and second panel databases; a panel layout step of placing the panels selected in the panel selection step in the frames; a screen display control step of displaying the game display screen on a screen display unit; and a frame execution step of executing the frames in which the panels are disposed in the panel layout step, based on panel information indicating characteristics of the panels disposed in the frames.

My information processing apparatus is an information processing apparatus that controls a game in which first and second characters do battle. The information processing apparatus includes: a data storage unit that stores a first panel database that includes a plurality of panels that the first character possesses, and a second panel database that includes a plurality of panels that the second character possesses; and a control unit. The control unit includes: a screen display control section that displays a game display screen that includes a display region formed by one or more frames on a screen display unit; a panel selection section that selects panels to be disposed in the frames of the display region, from the first and second panel databases; a panel layout section that places the panels selected by the panel selection section in the frames; and a frame execution section that executes the frames, in which the panels are disposed by the panel layout section, in predetermined order.

My information processing apparatus controls a game in which first and second characters do battle. The information processing apparatus includes: a data storage unit that stores a first panel database that includes a plurality of panels that the first character possesses, and a second panel database that includes a plurality of panels that the second character possesses; and a control unit. The control unit includes: a screen display control section that displays a game display screen that includes a display region formed by one or more frames on a screen display unit; a panel selection section that selects panels to be disposed in the frames of the display region, from the first and second panel databases; a panel layout section that places the panels selected by the panel selection section in the frames; and a frame execution section that executes the frames in which the panels are disposed by the panel layout section, based on panel information indicating characteristics of the panels disposed in the frames.

According to the storage medium, the game processing method, and the information processing apparatus, it is possible to provide a game that gives a user a high visual effect.

BRIEF DESCRIPTION OF THE DRAWINGS

FIG. 10 is a schematic diagram explaining an example of the game.

DETAILED DESCRIPTION

A game program according to examples will be described with reference to the accompanying diagrams.

The game program is for a game in which the first and second characters battle against each other, and causes a computer to realize a data storage function, a panel selection function, a panel layout function, a screen display control function, and an emphasized display function.

Figure 1:
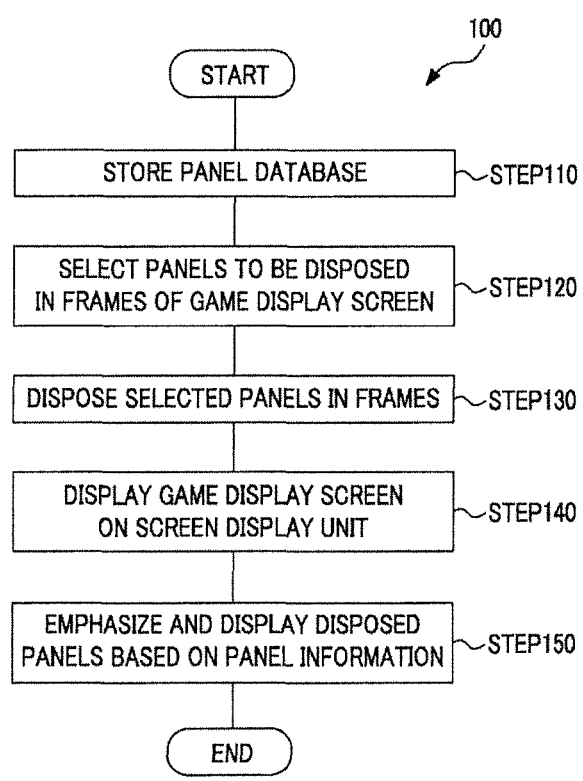
FIG. 1 is a flowchart showing an example of a game program.

FIG. 1 is a flowchart showing an example of a game program 100.

Using the data storage function, a first panel database including a plurality of panels that the first character possesses and a second panel database including a plurality of panels that the second character possesses are stored (STEP 110). This function can be realized by a data storage unit to be described later.

Using the panel selection function, panels to be disposed in frames of the game display screen including a battle display region formed by one or more frames are selected from the first panel database including a plurality of panels that the first character possesses and the second panel database including a plurality of panels that the second character possesses (STEP 120). This function can be realized by a panel selection section to be described later.

Using the panel layout function, the panels selected by the panel selection function are disposed in the frames (STEP 130). This function can be realized by a panel layout section to be described later.

Using the screen display control function, the game display screen is displayed on a screen display unit (STEP 140). The screen display unit receives a signal output from a screen display control section of an information processing apparatus, which will be described later. For example, a display device provided in a user terminal can be used. In addition, it is possible to use a touch panel type display that also serves as an input unit to be described later. This function can be realized by the screen display control section to be described later.

Using the emphasized display function, the panel disposed by the panel layout function is emphasized and displayed on the screen display unit based on the panel information indicating the characteristics of the panel (STEP 150). "Emphasized display" refers to displaying a specific panel of the panels disposed in the frames noticeably compared with the other panels. As examples of emphasized display, it is possible to display a movie or display a frame to surround the panel. This function can be realized by an emphasized display section to be described later.

The game program can be executed in a server apparatus or a user terminal to perform each process of the game described above. In addition, the game program can be provided in a state where the game program is recorded on a computer-readable recording medium. Recording media is not particularly limited as long as the recording media can be read by the computer such as a CD-ROM and a DVD.

Next, a game processing method according to an example will be described.

The game processing method is for a game in which the first and second characters battle against each other, and includes a data storage step, a panel selection step, a panel layout step, a screen display control step, and an emphasized display step.

In the data storage step, a first panel database including a plurality of panels that the first character possesses and a second panel database including a plurality of panels that the second character possesses are stored. This step can be processed by the data storage unit to be described later.

In the panel selection step, panels to be disposed in frames of the game display screen including a battle display region formed by one or more frames are selected from the first and second panel databases. This step can be processed by the panel selection section to be described later.

In the panel layout step, the panels selected in the panel selection step are disposed in the frames. This step can be processed by the panel layout section to be described later.

In the screen display control step, the game display screen is displayed on the screen display unit. This step can be processed by the screen display control section to be described later.

In the emphasized display step, the panel disposed in the panel layout step is emphasized and displayed on the screen display unit based on the panel information indicating the characteristics of the panel. This step can be processed by the emphasized display section to be described later.

Next, an information processing apparatus according to an example will be described with reference to the accompanying diagrams.

Figure 2:
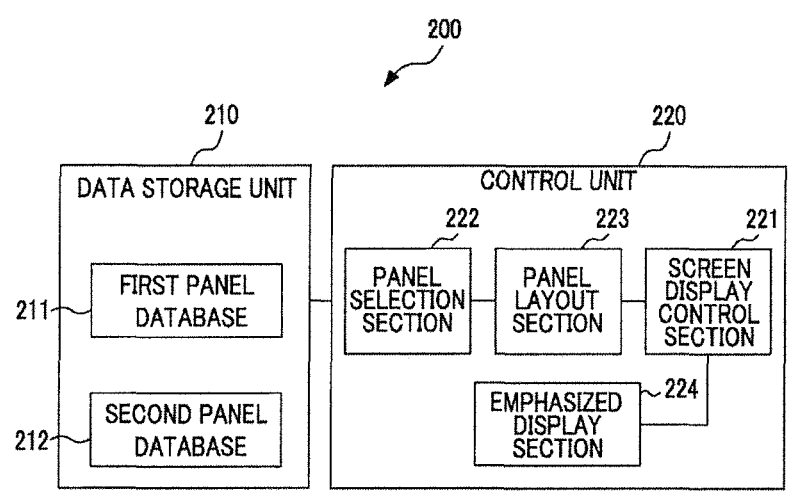
FIG. 2 is a block diagram showing an example of an information processing apparatus.

FIG. 2 is a block diagram schematically showing an example of the information processing apparatus.

An information processing apparatus 200 controls a game in which the first and second characters battle against each other, and includes a data storage unit 210 and a control unit 220.

The data storage unit 210 stores a first panel database 211 that includes a plurality of panels that the first character possesses, and a second panel database 212 that includes a plurality of panels that the second character possesses.

The control unit 220 includes: a screen display control section 221 that displays a game display screen that includes a battle display region formed by one or more frames on the screen display unit; a panel selection section 222 that selects panels to be disposed in the frames of the battle display region, from the first panel databases 211 and second panel databases 212; a panel layout section 223 that disposes the panels selected by the panel selection section 222 in the frames; and an emphasized display section 224 that emphasizes and displays the panels disposed by the panel layout section 223 on the screen display unit based on the panel information indicating the characteristics of the panels. As the screen display unit, a display device and the like can be mentioned. In addition, it is possible to use a touch panel type display that also serves as an input unit to be described later.

A first panel group configured to include a plurality of panels that the first character possesses is stored in the first panel database 211.

A second panel group configured to include a plurality of panels that the second character possesses is stored in the second panel database 212.

Although not shown in the diagram, the information processing apparatus 200 can include an input receiving unit that receives an input to give an instruction to the control unit 220. As means for the input received by the input receiving unit, everything that the information processing apparatus operated by the user may have such as buttons, a keyboard or a mouse, is included. In addition, as described above, it is also possible to use a touch panel type input.

While the information processing apparatus 200 can be a server apparatus or a user terminal such as a mobile phone or a smart phone, the information processing apparatus 200 can also be configured to include a user terminal and a server apparatus.

Figure 3:
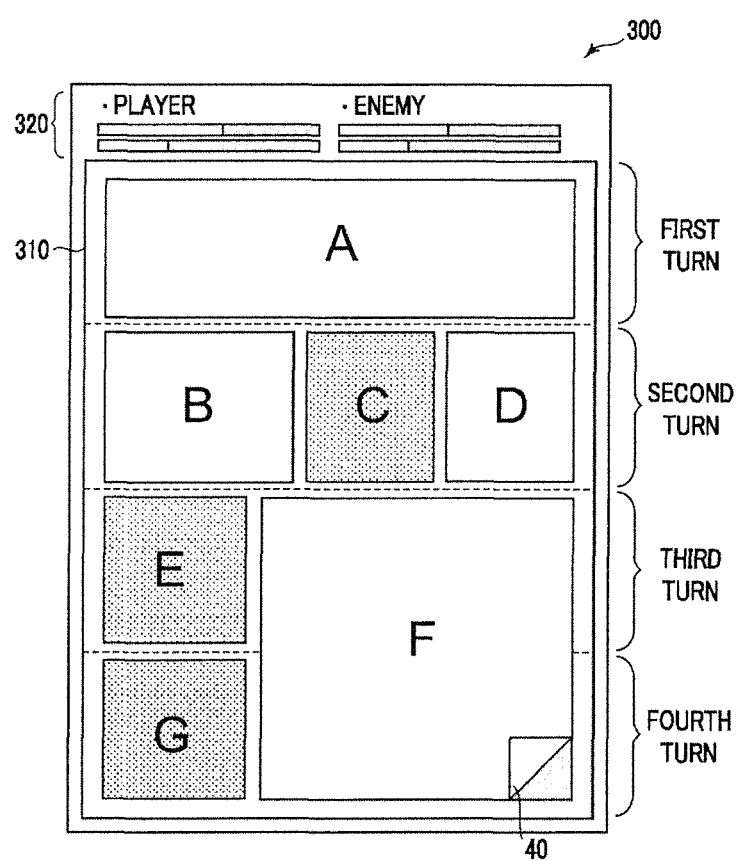
FIG. 3 is a schematic diagram showing an example of a game display screen.

FIG. 3 is a diagram schematically showing an example of a game display screen 300 displayed on the screen display unit. As shown in FIG. 3, the game display screen 300 is a game display screen of a game in which the first and second characters battle against each other. The game display screen 300 includes a battle display region 310 formed by one or more frames (in FIG. 3, frames A to G).

As shown in FIG. 3, a character (PLAYER) that the user uses can be set as the first character, and a character (ENEMY) that the computer uses can be set as the second character. Alternatively, although not shown in the diagram, the character (PLAYER) that the user uses can be set as the first character, and a character (FRIEND) that another user uses can be set as the second character.

Panels selected from the first panel group configured to include a plurality of panels that the first character possesses and the second panel group configured to include a plurality of panels that the second character possesses are disposed in the frames A to G. In the example shown in FIG. 3, panels selected from the first panel group are disposed in the frames A, B, D, and F, and panels selected from the second panel group are disposed in the frames C, E, and G.

The emphasized display section 224 can execute the frames in predetermined order, and emphasize and display the panels disposed in the executed frames. The battle proceeds by executing the frames A to G in order of the frames A, B, C, D, E, F, and G.

That is, according to the game display screen 300 according to the example, the battle between the first and second characters proceeds in a format like a cartoon. Therefore, since the user can play the game with a sense of reading a cartoon, the visual effect that the user receives is greatly improved compared to known games.

In the game display screen 300, the battle can be performed based on the panel information regarding the panel that is emphasized and displayed by the emphasized display section 224. In this case, the panel information is assumed to include information regarding the size of the panel.

In addition, each panel described above can have an arbitrary size. In the example shown in FIG. 4, the game display screen 300 includes the battle display region 310 formed by frames H to O. In the battle display region 310 divided into cells of "4 columns×4 rows," each of panels disposed in the frames H and N has a size corresponding to four cells. Similarly, each of panels disposed in the frames J and O has a size corresponding to two cells, and each of panels disposed in the frames I, K, L, and M has a size corresponding to one cell.

Specifically, assuming that each row indicates a turn of a battle, the occupancy of action in each turn in horizontally long frames such as the frames H, N, and O, is high compared to that in horizontally short frames such as the frames I, J, K, L, and M. Accordingly, for example, in the first turn, only the action of the first player is performed.

In the vertically long frames such as the frames J and N, their actions are first performed in the previous turn. That is, for example, the frame J over the second and third turns is executed prior to the frame M disposed in the third turn.

That is, a panel the size of which is larger and presents at a position where a turn number is earlier leads a battle advantageously.

In addition, although the case where the battle proceeds from the upper left to the lower right is shown in the example described above, the battle may proceed from the upper right to the lower left.

As described above, it is preferable that the battle display region 310 be divided by the turn indicating the unit of the progress of the battle.

In addition, it is preferable that the shape of the panel be a rectangle. Panels can have various shapes such as a circle, a triangle, and a polygon, as well as the rectangle (including a square) such as a card in the related art.

In addition, it is preferable that the panel information described above include information on the capability of the panel. The capability information refers to information including attack, defense (avoidance), attributes, recovery, and skills to disable or replace the frame, for example. The effect of the capability is assumed to correspond to the size of the panel. Accordingly, the effect of the frames H and N with a large panel size is higher than that of the other frames.

Figure 5A:
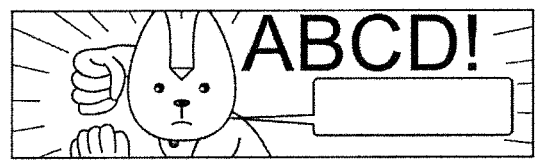
FIGS. 5A and 5B are schematic diagrams showing examples of a panel.
Figure 5B:
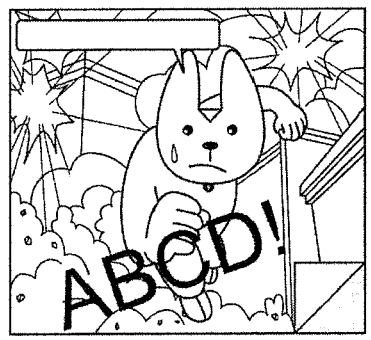

In addition, the panel can display a still image. As an example of the still image, as shown in FIGS. 5A and 5B, the action described above can be assumed to be expressed by way of illustration. FIG. 5A shows a still image of a panel with information of attack, and the illustration of the character to make a punch attack is drawn. Similarly, FIG. 5B shows a still image of a panel with information of defense, and the illustration of the character to avoid the attack of the enemy is drawn.

Preferably, these panels display a movie when the panels are emphasized and displayed. The movie is an animation that displays a plurality of still images consecutively.

Figure 6:
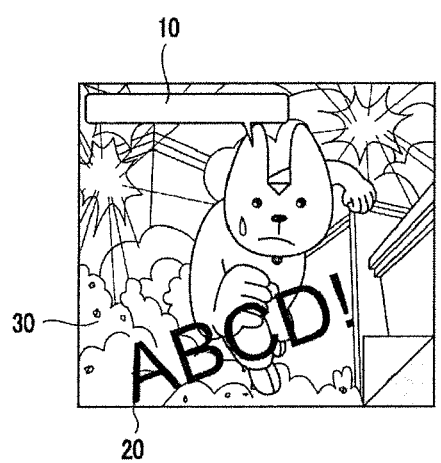
FIG. 6 is a schematic diagram showing an example of the panel.

FIG. 6 is a diagram schematically showing the panel of the frame F shown in FIG. 3. As shown in FIG. 6, it is preferable that the frame described above further have a text display portion 10 to display texts. Preferably, the text display portion 10 is displayed to overlap the panel disposed in the frame.

In addition to the panel described above, the frame preferably has a sound effect display portion 20 to display the texts showing the sound effect and/or an effect display portion 30 to display the effect. These portions can be displayed with a movie when the frame is emphasized and displayed. Due to these portions, the visual effect given to the user is further improved. In addition, the information processing apparatus operated by the user may be vibrated in conjunction with the sound effect display portion 20 or the like.

It is preferable that the panel, which is emphasized and displayed, be disposed in the middle of the game display screen 300. That is, the panel that is emphasized and displayed is displayed to zoom in. Accordingly, the visual effect given to the user is further improved.

In addition, it is preferable that the frame have a frame portion. In this frame portion, it is preferable that a frame portion of a frame in which the panel selected from the first panel group is disposed, and a frame portion of a frame in which the panel selected from the second panel group is disposed, be constructed in different colors. In this case, the panel of the first character and the panel of the second character can be visually easily distinguished.

In addition, as shown in FIG. 3, when the battle does not fit in the battle display region 310, it is preferable to provide a page turn portion 40 to proceed to the next page in a part of the frame executed at the end.

Preferably, the panels described above are automatically disposed in the frames by a computer. In this case, it is possible to save the time and effort taken for the user to dispose the panels. The battle result is preferably determined based on the panel information at a stage where the panels are disposed. In addition, it is also possible to change the battle result by changing the panel, which is displayed on the next page, by the operation (action for recovery or the like) of the user during the battle.

Figure 4:
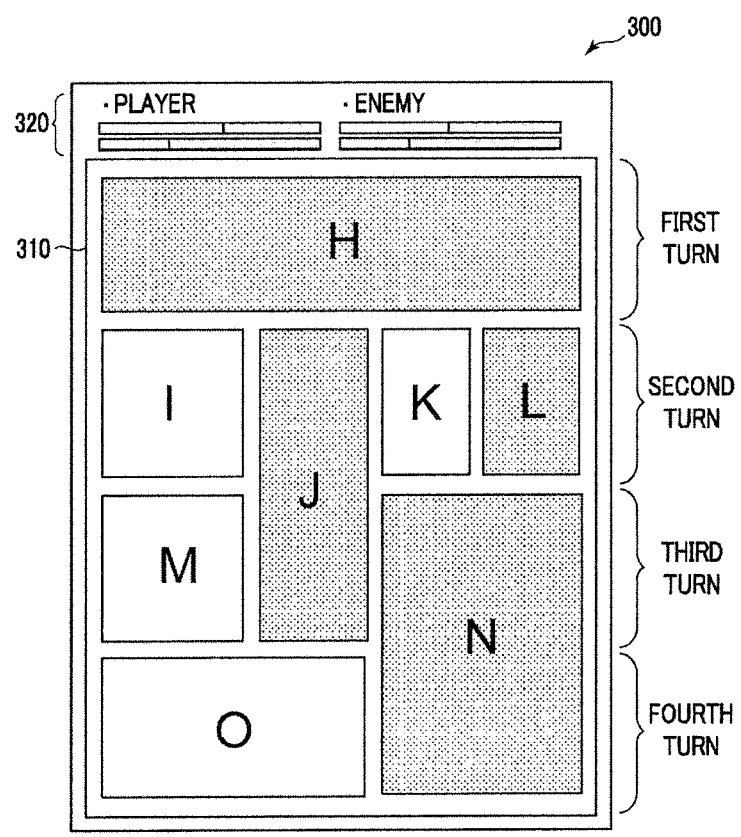
FIG. 4 is a schematic diagram showing an example of the game display screen.

In addition, as shown in FIGS. 3 and 4, the game display screen 300 can include a gauge display portion 320 to display the gauge of the character. This gauge shows hit points (hereinafter, described as HP) indicating the strength of the character or character points (hereinafter, described as CP) indicating the action force of the character. The HP is decreased by receiving the action of the attack of the opponent, and is increased by taking action for recovery. On the other hand, the CP is decreased by placing a large panel.

In FIG. 4, an example is shown in which all sizes of the panel objects can be expressed as an integral multiple of the cell. However, this disclosure is not limited to this.

Next, the basic flow of a game displayed on the game display screen will be described.

Figure 7:
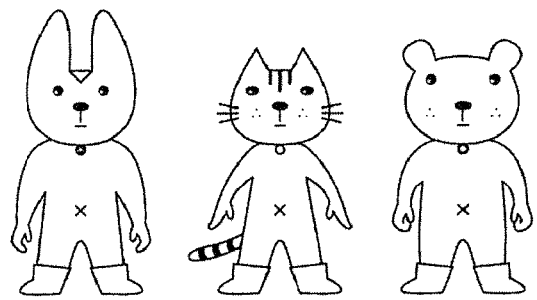
FIG. 7 is a schematic diagram explaining an example of the game.
Figure 8:
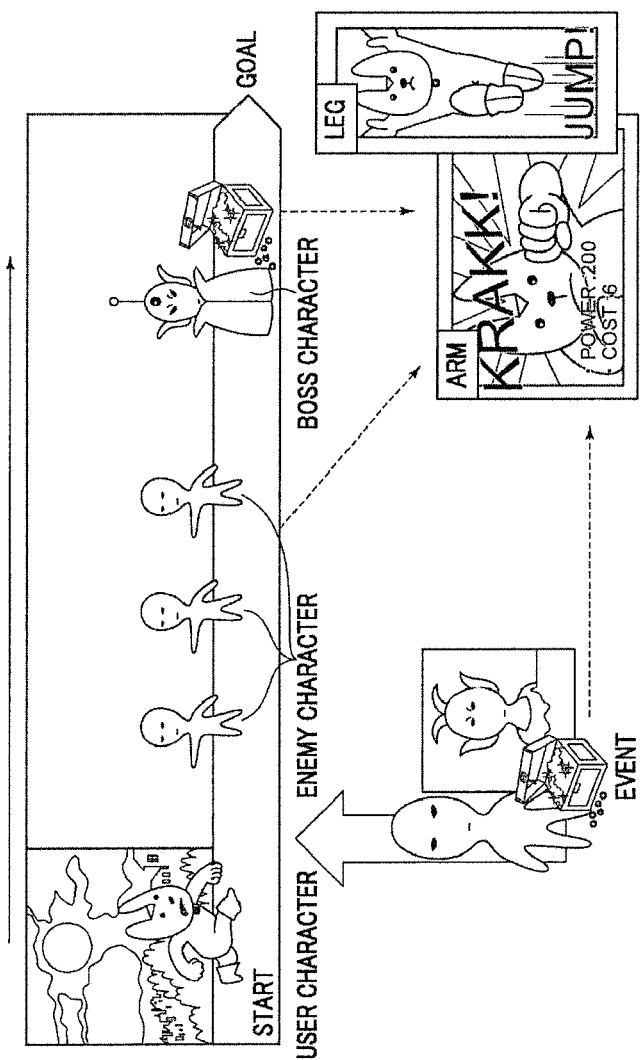
FIG. 8 is a schematic diagram explaining an example of the game.

A game described as an example herein has a main cycle and a sub-cycle. In the main cycle, as shown in FIG. 7, the user selects one character from a plurality of characters presented, and collects panels while advancing the quest. For a plurality of characters, it is possible to set the characteristics such as power type, speed type, stamina type and balanced type. FIG. 8 shows an example of the quest and the character selected by the user does battle with a boss character after a battle with a plurality of enemy characters. A panel can be acquired as a reward for the battle with the enemy characters and the boss character. In addition, it is also possible to acquire the panel in a specific event or the like. Thus, the user acquires the panel by advancing the game.

Figure 9:
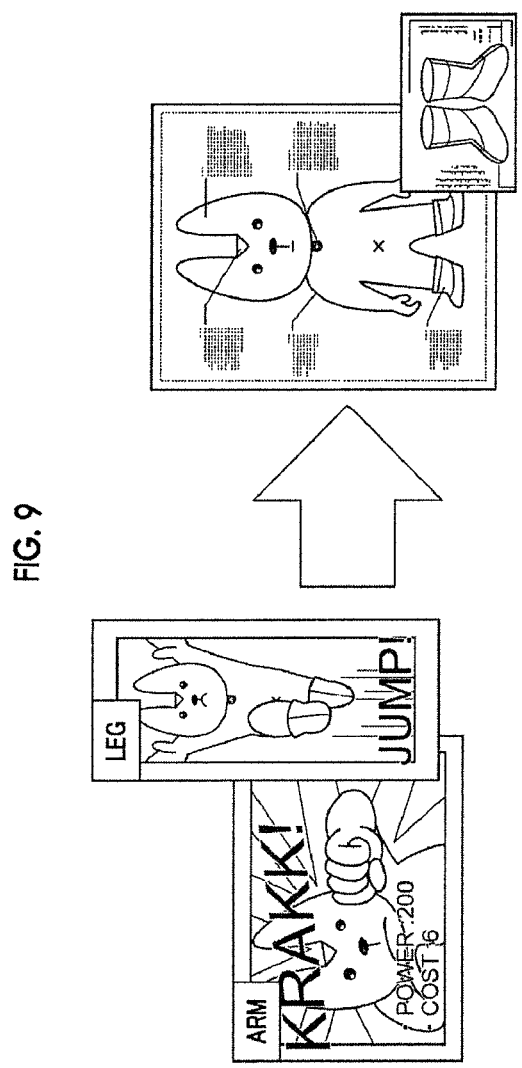
FIG. 9 is a schematic diagram explaining an example of the game.

Then, in the sub-cycle, the user can use the acquired panel to strengthen the deck for the battle or can use the acquired panel to develop a character. Developing the character refers to combining the character selected by the user with the acquired panel. As shown in FIG. 9, panels are used to strengthen each part (body, arms, legs, skill, and the like) of the body of the character. For example, a panel with information of the strength is used to strengthen the body of the character, a panel with information of the attack is used to strengthen the arms of the character, a panel with information of the defense is used to strengthen the legs of the character, and a panel with information of special technique effects during the battle is used to reinforce the skills of the character. In addition, a setting to make it possible to select a larger number of other characters or to use a stronger panel as the level of the character rises can also be made.

As shown in FIG. 10, as a reward for the battle or the event, there is an evolution material in addition to the panel. By using this evolution material, the selected character can be evolved into a character wearing a different costume. The character after evolution can have a capability exceeding the upper limit of the capability of the selected character before evolution.

Figure 11B:
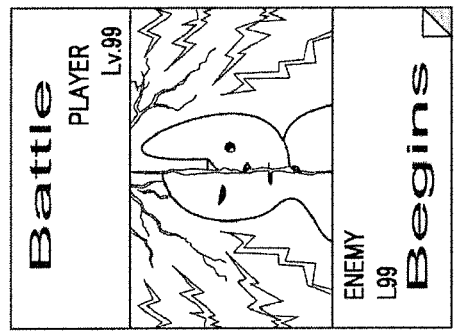
FIGS. 11A and 11B are schematic diagrams explaining examples of the game.
Figure 11A:
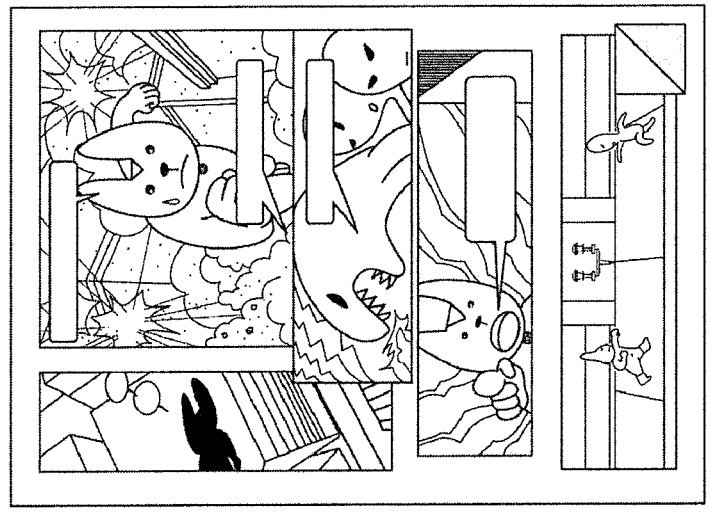

As shown in FIG. 11A, even before the battle, it is possible to advance the story in a format like a cartoon. Then, after a battle start screen is displayed as shown in FIG. 11B, the battle is started.

Figure 12:
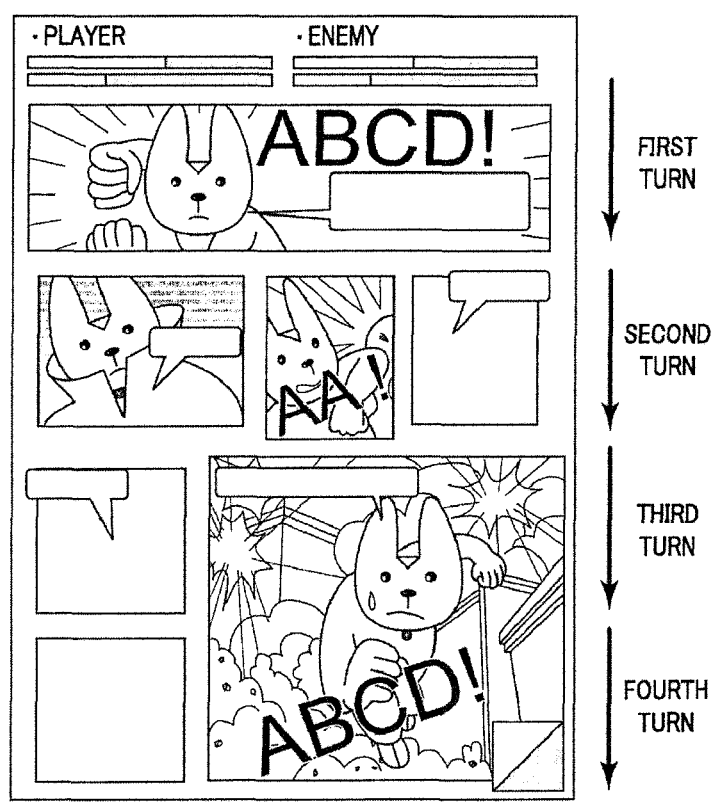
FIG. 12 is a schematic diagram explaining an example of the game.

In such a flow of the game, when a battle starts, the battle using the game display screen described above is performed. FIG. 12 shows another example of the game display screen. For the enemy character and the character selected by the user, it is possible to set the compatibility according to the attributes. In addition, when three or more specific panels are disposed within one game display screen, it is also possible to generate a combo exhibiting the effect beyond the effects of these cards.

Those described above show example of the representative configurations, and my storage media, game programs, methods and apparatus are not limited to the example.

What is claimed is:

1. A non-transitory computer readable recording medium storing game program code instructions for a game in which a first user and a second user do battle, and when the game program code instructions are executed by a computer, the game program code instructions cause the computer to perform:
   a data storage function of storing a first panel database that includes a plurality of panels that the first user possesses, and a second panel database that includes a plurality of panels that the second user possesses;
   a panel selection function of selecting one or more panels to be disposed in one or more divisions of a game display screen including a display region formed by the divisions, from the first panel database and the second panel database;
   a panel layout function of disposing the panels selected by the panel selection function in the divisions; and
   a screen display control function of displaying the game display screen on a screen display unit, wherein
   the data storage function further stores points set for the first user, which are decreased by disposing a panel,
   the panel selection function selects a panel from the first panel database according to the points set for the first user,
   the divisions include a division where a panel selected from the first panel database is allowed to be disposed and a division where a panel selected from the second panel database is allowed to be disposed, and
   the panel layout function disposes the panel selected by the panel selection function in a target division when the panel is allowed to be disposed in the target division.

2. The recording medium according to claim 1, causing a computer to further perform a division execution function of executing the divisions in which the panels are disposed by the panel layout function in predetermined order.

3. The recording medium according to claim 2, wherein the predetermined order is determined based on arrangement, shapes, and/or sizes of the panels.

4. The recording medium storing the game program according to claim 2, causing a computer to further perform:
   an emphasized display function of emphasizing and displaying the panels disposed in the divisions executed by the division execution function.

5. The recording medium according to claim 1, causing a computer to further perform a division execution function of executing the divisions in which the panels are disposed by the panel layout function, based on panel information indicating characteristics of the panels disposed in the divisions.

6. The recording medium according to claim 5, wherein the panel information includes information regarding a size of each panel.

7. The recording medium according to claim 5,
   wherein the panel information includes information regarding a capability of each panel, and
   strength of the capability corresponds to the size of each panel.

8. The recording medium according to claim 1, wherein the plurality of panels are given according to progress of the game.

9. The recording medium according to claim 1, wherein the display region is divided by a plurality of turns.

10. The recording medium according to claim 1, wherein each of the panels displays a still image.

11. The recording medium according to claim 1,
    wherein each of the divisions further possesses a text display portion for displaying texts, and
    the text display portion is displayed to overlap the panel disposed in the division.

12. The recording medium according to claim 1,
    wherein each of the divisions has a frame portion, and
    a frame portion of a division in which a panel selected from the first panel database is disposed, and a frame portion of a division in which a panel selected from the second panel database is disposed, are constructed in different colors.

13. The recording medium according to claim 1, wherein a configuration of the divisions is changed according to progress of the game.

14. A game processing method for a game in which a first user and a second user join battles, and when executed by a computer, the game processing method causes the computer to perform:
    a data storage step of storing a first panel database that includes a plurality of panels that the first user possesses, and a second panel database that includes a plurality of panels that the second user possesses;
    a panel selection step of selecting one or more panels, which are to be disposed in one or more divisions of a game display screen including a display region formed by the divisions, from the first panel database and the second panel database;
    a panel layout step of disposing the panels selected by the panel selection step in the divisions; and
    a screen display control step of displaying the game display screen on a screen display unit, wherein
    the data storage step further stores points set for the first user, which are decreased by disposing a panel,
    the panel selection step selects a panel from the first panel database according to the points set for the first user,
    the divisions include a division where a panel selected from the first panel database is allowed to be disposed and a division where a panel selected from the second panel database is allowed to be disposed, and
    the panel layout step disposes the panel selected by the panel selection step in a target division in a case where the panel is allowed to be disposed in the target division.

15. An information processing apparatus that controls a game in which a first user and a second user do battle, comprising:
    a server apparatus or user terminal, comprising;
    a data storage unit that stores a first panel database that includes a plurality of panels that the first user possesses, and a second panel database that includes a plurality of panels that the second user possesses; and
    a control unit,
    wherein the control unit includes:
    a screen display control section that displays a game display screen that includes a display region formed by one or more divisions, on a screen display unit;
    a panel selection section that selects panels to be disposed in the divisions of the display region, from the first panel database and the second panel database; and
    a panel layout section that disposes the panels selected by the panel selection section in the divisions, wherein
    the data storage unit further stores points set for the first user, which are decreased by disposing a panel, the panel selection section selects a panel from the first panel database according to the points set for the first user, the divisions include a division where a panel selected from the first panel database is allowed to be disposed and a division where a panel selected from the second panel database is allowed to be disposed, and the panel layout section disposes the panel selected by the panel selection section in a target division when the panel is allowed to be disposed in the target division.

* * * * *

(12) POST-GRANT REVIEW CERTIFICATE (211th)
United States Patent
Atobe

(10) Number: US 9,636,583 J1
(45) Certificate Issued: Oct. 27, 2021

(54) STORAGE MEDIUM STORING GAME PROGRAM, GAME PROCESSING METHOD, AND INFORMATION PROCESSING APPARATUS

(71) Applicant: Hirohiko Atobe

(72) Inventor: Hirohiko Atobe

(73) Assignee: GREE, INC.

Trial Number:

PGR2018-00029 filed Feb. 1, 2018

Post-Grant Review Certificate for:

Patent No.: 9,636,583
Issued: May 2, 2017
Appl. No.: 15/253,964
Filed: Sep. 1, 2016

The results of PGR2018-00029 are reflected in this post-grant review certificate under 35 U.S.C. 328(b).

POST-GRANT REVIEW CERTIFICATE
U.S. Patent 9,636,583 J1
Trial No. PGR2018-00029
Certificate Issued Oct. 27, 2021

AS A RESULT OF THE POST-GRANT REVIEW PROCEEDING, IT HAS BEEN DETERMINED THAT:

Claims 1-15 are cancelled.

\* \* \* \* \*